United States Patent
Maddock (10) Patent No.: US 9,633,067 B2
(45) Date of Patent: Apr. 25, 2017

(54) GOLD DATA SET AUTOMATION

(71) Applicant: LANDMARK GRAPHICS CORPORATION, Houston, TX (US)

(72) Inventor: Lloyd Maddock, London (GB)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 14/781,576

(22) PCT Filed: Jun. 13, 2014

(86) PCT No.: PCT/US2014/042388
§ 371 (c)(1),
(2) Date: Sep. 30, 2015

(87) PCT Pub. No.: WO2015/191087
PCT Pub. Date: Dec. 17, 2015

(65) Prior Publication Data
US 2016/0147822 A1    May 26, 2016

(51) Int. Cl.
*G06F 17/30*  (2006.01)
*E21B 44/00*  (2006.01)

(52) U.S. Cl.
CPC ........ *G06F 17/30371* (2013.01); *E21B 44/00* (2013.01); *G06F 17/30528* (2013.01)

(58) Field of Classification Search
CPC ...... G06F 17/16; G06F 17/50; G06F 17/5009; G06F 17/10; G06F 17/30371;
(Continued)

(56) References Cited

U.S. PATENT DOCUMENTS 6,727,107 B1 * 4/2004 Dunton ................ B24B 37/042
                                                    438/14
6,801,197 B2 * 10/2004 Sanstrom ................ G01V 1/34
                                                    345/419
(Continued)

FOREIGN PATENT DOCUMENTS

WO    2009015252    1/2009
WO    2009018450    2/2009

OTHER PUBLICATIONS

Ixchel Faniel et al.—"The Challenges of Digging Data: A Study of Context in Archaeological Data Reuse"—Proceeding JCDL '13 Proceedings of the 13th ACM/IEEE—CS joint conference on Digital libraries—pp. 295-304—Indianapolis, Indiana, USA—Jul. 22-26, 2013.*

(Continued)

*Primary Examiner* — Anh Ly
(74) *Attorney, Agent, or Firm* — Locke Lord LLP (57) ABSTRACT

Creation and maintenance of preferred or "gold" data sets are automated using objective, predefined rules or filters. The rules may be applied as part of a data publication workflow when new data becomes available in a database. The rules govern the type of data to be included in a gold data set, the currency of the data, the quality of the data, and the naming of the data. This helps reduce the amount of work required by users to create gold data sets and also ensures that the gold data set are up-to-date and high-value. The disclosed approach is particularly suited for use with data from hydrocarbon exploration and production related operations.

14 Claims, 6 Drawing Sheets

(58) Field of Classification Search
CPC .. G06F 17/30528; G06F 17/30; G06F 3/0486;
G06F 3/0482; G01V 99/005; G01V 3/30;
G01V 1/30; G01V 1/38; G01V 2210/56;
G01V 3/18; G01V 3/38; G01V 1/28;
G01V 1/32; G01V 1/34; G01V 1/36;
G01V 1/50; G01V 2210/60; E21B 43/26;
E21B 44/00; G05B 19/02; C09K 8/80;
C09K 8/68; C09K 8/42
See application file for complete search history.

(56) References Cited

U.S. PATENT DOCUMENTS

| | | | | |
|---|---|---|---|---|
| 7,532,984 | B2 | 5/2009 | Syngaevsky | |
| 8,209,202 | B2* | 6/2012 | Narayanan | G06Q 10/04 705/7.11 |
| 8,457,997 | B2* | 6/2013 | Narayanan | G06Q 10/04 705/7.11 |
| 2003/0083756 | A1* | 5/2003 | Hsiung | G05B 15/02 700/28 |
| 2004/0098200 | A1* | 5/2004 | Wentland | G01V 1/34 702/2 |
| 2008/0243749 | A1* | 10/2008 | Pepper | G01V 1/34 702/16 |
| 2009/0125362 | A1* | 5/2009 | Reid | G06F 8/30 705/7.27 |
| 2009/0182472 | A1* | 7/2009 | Singh | E21B 47/12 701/50 |
| 2010/0127701 | A1* | 5/2010 | Wichers | G01V 11/00 324/303 |
| 2010/0138157 | A1* | 6/2010 | Sun | G01V 3/32 702/6 |
| 2010/0171740 | A1* | 7/2010 | Andersen | G01V 99/00 715/848 |
| 2011/0042080 | A1* | 2/2011 | Birchwood | G01V 1/50 703/10 |
| 2011/0125740 | A1* | 5/2011 | Peters | G06F 17/30716 707/736 |
| 2011/0157235 | A1* | 6/2011 | FitzSimmons | G01V 99/00 345/672 |
| 2011/0288842 | A1* | 11/2011 | Gutierrez Ruiz | E21B 43/00 703/10 |
| 2012/0054246 | A1* | 3/2012 | Fischer | G06Q 10/06 707/793 |
| 2012/0279277 | A1 | 11/2012 | Parusel et al. | |
| 2013/0063433 | A1* | 3/2013 | Lin | G01V 1/48 345/419 |
| 2014/0157074 | A1* | 6/2014 | Zhang | G06F 11/0727 714/746 |
| 2014/0372044 | A1* | 12/2014 | Jiao | G01V 1/282 702/16 |
| 2015/0081265 | A1* | 3/2015 | Kauerauf | G06F 17/5009 703/10 |
| 2015/0095279 | A1* | 4/2015 | Ludvigsen | G06F 17/30589 707/603 |
| 2015/0247940 | A1* | 9/2015 | de Matos Ravanelli | G01V 1/30 703/10 |

OTHER PUBLICATIONS

Lan Zhao et al.—"Developing an integrated end-to-end TeraGrid climate modeling environment"—Proceeding TG '11 Proceedings of the 2011 TeraGrid Conference: Extreme Digital Discovery Article No. 46—pp. 1-7—Salt Lake City, Utah—Jul. 18-21, 2011.*
International Search Report for PCT Application No. PCT/US2014/042388 dated Feb. 27, 2015.
Written Opinion for PCT Application No. PCT/US2014/042388 dated Feb. 27, 2015.

* cited by examiner

GOLD DATA SET AUTOMATION

FIELD OF THE INVENTION

The exemplary embodiments disclosed herein relate generally to exploration and production of hydrocarbons from subterranean formations, and particularly to a method, system, and computer program product for processing data generated from such hydrocarbon exploration and production.

BACKGROUND OF THE INVENTION

Hydrocarbon exploration and production involve numerous operations performed by multiple parties using a wide range of tools and technologies. The sheer volume of data generated by these operations can make it difficult to identify and separate useful data from redundant or outdated data. For example, data may be generated related to well sites, drilling rigs, boreholes, subsurface formations, and the like. Just the raw borehole log data from acquisition companies alone can typically include large amounts of extraneous or otherwise low-value curves.

Additionally, acquisition of certain types of data from multiple logging runs and multiple tools within those runs can lead to repeated, though not identical readings for those data types. Routine editing and interpretation of such data over time can lead to a proliferation of inconsistent data as different data technicians and interpreters use different assumptions or apply different software and techniques to the data. The result is that it may often be difficult for a user to identify the best data to use for further processing, plotting, modeling, and the like.

Attempts to mitigate the above problems have involved users creating special or preferred data sets referred to as "gold" data sets. These gold data sets are usually labeled or otherwise named in a way that makes it readily evident they are considered by the users to contain the current "best" data available for use in future work. A drawback of the above approach is that the process is largely manual in nature, requiring the user to make a subjective determination as to which data is the best available. This may lead to problems with currency in that the presumed gold data set may not always be updated in a timely manner as new data becomes available, with quality in that the rules used to identify the data may not always be explicit or consistently applied, and with the amount of work required in that it takes much time and effort to find and label the best available data.

Accordingly, a need exists for a way to create gold data sets that ensures currency and quality and also reduces the amount of work required while minimizing the manual nature of the process.

BRIEF DESCRIPTION OF THE DRAWINGS

The foregoing and other advantages of the exemplary disclosed embodiments will become apparent upon reading the following detailed description and upon reference to the drawings, wherein.

DETAILED DESCRIPTION OF THE DISCLOSED EMBODIMENTS

Following now is a detailed description of exemplary disclosed embodiments. It will be appreciated that the development of an actual, real commercial application incorporating aspects of the exemplary disclosed embodiments will require many implementation specific decisions to achieve the developer's ultimate gold for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It will also be appreciated that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

As alluded to earlier, the exemplary disclosed embodiments relate to a computer-implemented method, system, and computer program product for creating gold data sets. The embodiments help automate the creation of gold data sets in an objective manner and also facilitate their maintenance according to standardized rules or filters, for example, as new data is published or becomes available in a database. This helps reduce the amount of work required by users to create the gold data sets and also ensures that the gold data set are up-to-date and high-value.

In preferred embodiments, the creation and maintenance of gold data sets may be implemented as part of a data publication workflow. The data publication workflow is typically used to process newly acquired or recently generated data in order to prepare such data for publication or to otherwise make such data available to users. Gold data sets may then be created by applying an objective, standard, and predefined set of rules or filters to the published or to-be-published data to determine whether any of the new data should be added to the gold data sets.

The exemplary disclosed embodiments are particularly suited for data derived from hydrocarbon exploration and production related operations, although the concepts and teachings disclosed herein are equally applicable to other industries. In such hydrocarbon exploration and production operations, the gold data sets may include the best raw, edited, or processed well log data available, but may also include stratigraphic tops, plots, or other types of data where similar problems may occur in identifying what is currently considered the highest quality data.

Figure 1:
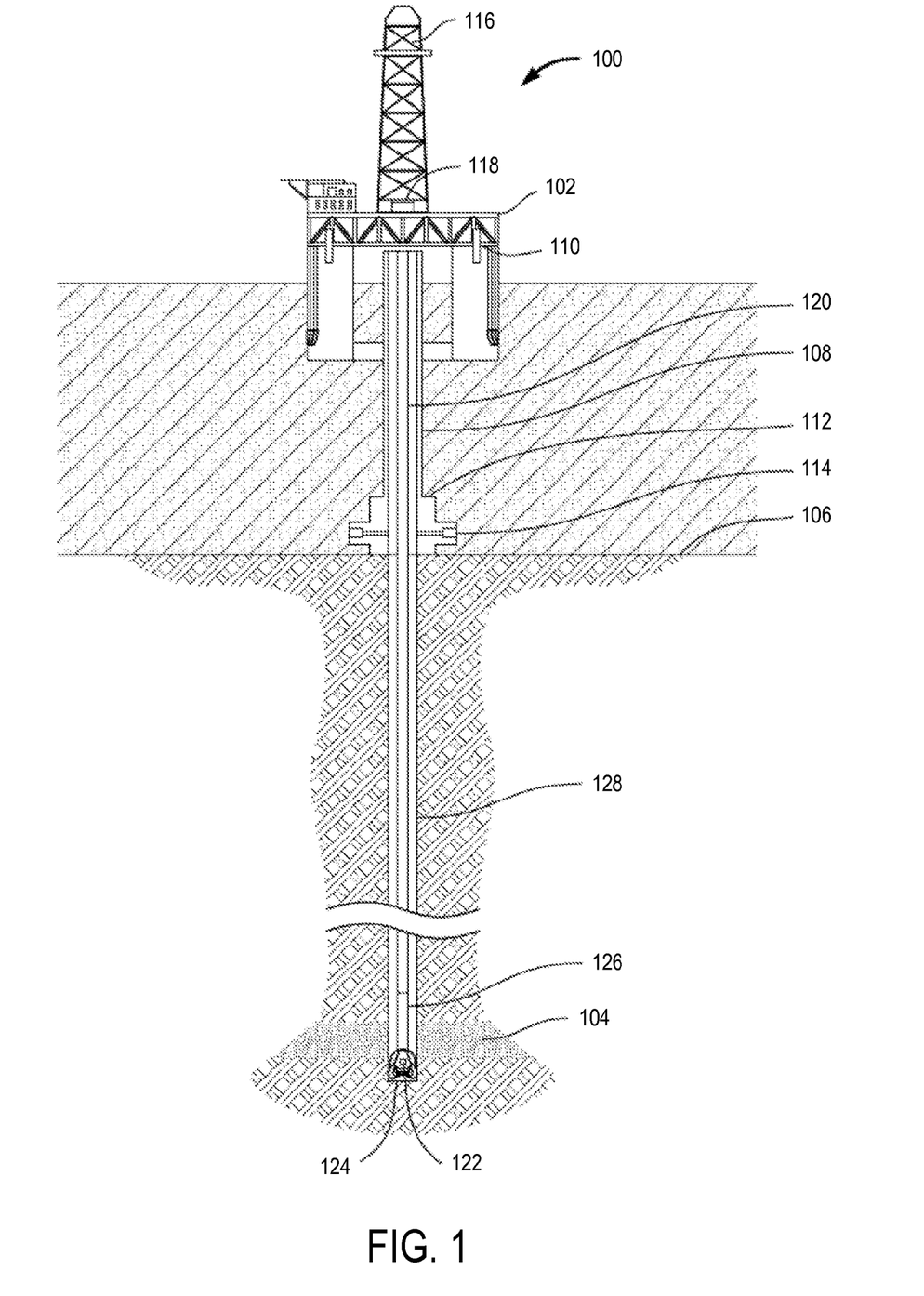
FIG. 1 is a schematic diagram of an offshore oil or gas drilling platform for which gold data may be derived according to the disclosed embodiments.

Referring now to FIG. 1, a typical drilling structure 100 is shown, such as an offshore drilling structure, from which data may be obtained for a gold data set according to the embodiments disclosed herein. The drilling structure 100 typically includes a semisubmersible drilling platform 102 centered over a well bore in an oil or gas formation 104 located below a sea floor 106. A subsea conduit 108 typically extends from a deck 110 of the platform 102 to a well head installation 112 including blowout preventors 114. The platform 102 typically has a derrick 116 and a hoisting apparatus 118 for raising and lowering a drill string 120, also called "tripping." The drill string 120 is typically attached to a drill bit 122 having tools and sensors 124 mounted thereon for monitoring and measuring various aspects of the drilling operation. The drill bit 122 itself is typically mounted to the drill string 120 via a drill collar 126. An outer casing 128 is typically cemented in the well bore to help protect the integrity of the well bore and form an annulus with the drill string 120 for removal of drilling fluid.

As evident from FIG. 1, there are multiple tasks and activities that need to be performed in connection with operating the drilling structure 100. Most of these tasks and activities require data in order to be performed and many of them also generate or acquire new data. In existing systems, the data needed to perform these various tasks and activities are typically published or otherwise posted to a centralized location, sometimes referred to as a "portal," where the data may be accessed by authorized users. The authorized users typically include designated personnel of the company or companies operating the drilling structure 100, but such data portal may also be made available to the external clients or customers of those companies in some cases. Likewise, the authorized users may also publish newly generated or acquired data to the data portal for others to access and use.

Figure 2:
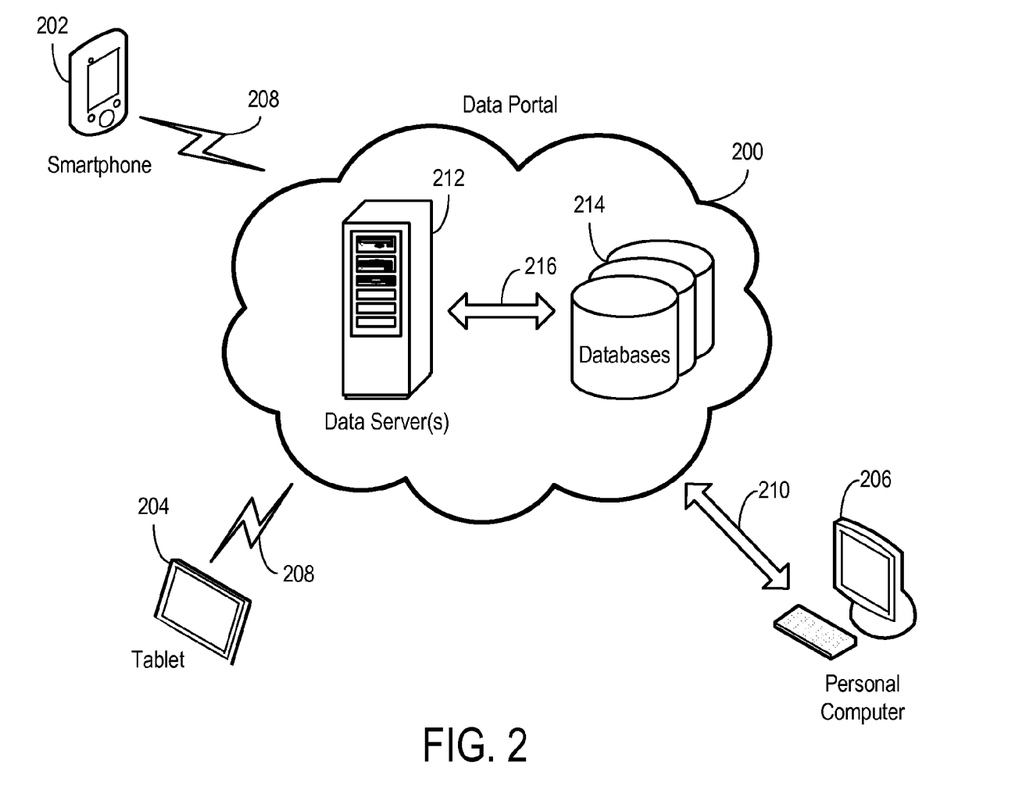
FIG. 2 is an exemplary data portal that may be used to publish gold data sets according to the disclosed embodiments.

An example of a data portal that may be used with the embodiments disclosed herein is shown at 200 in FIG. 2. The data portal 200 is typically a Web-based data portal that is accessible over a network, such as the Internet, but it may also be based on other standard or proprietary platforms. Users may then connect to or otherwise access the data portal 200 through a computing device, typically using a standard Web browser. The computing device may be any type of computing device capable of accessing a Web site or other hosted resource, including a smartphone 202, a tablet 204, and other mobile computing device, or it may be a more traditional computing device 206, such as a desktop, laptop, notebook computer, and the like. Connection to the data portal 200 may be accomplished using a network connection, which may be a wireless connection 208, a wired connection 210, or a combination of both.

One or more servers 212 may be used to host the data portal 200, for example, to provide front end functionality for the data portal 200, among other things. The one or more servers 212 may in turn be connected to one or more databases 214 that provide storage for the data on the data portal 200. Note that the term "server" is used herein to include traditional servers as well as high-end computers, workstations, mainframes, supercomputers, and the like. Similarly, the one or more databases 214 may include relational databases, operational databases, distributed databases, and other suitable databases capable of storing data and information. A network connection 216 between the one or more servers 212 and the one or more databases 214 allows them to exchange data and communication.

Figure 3:
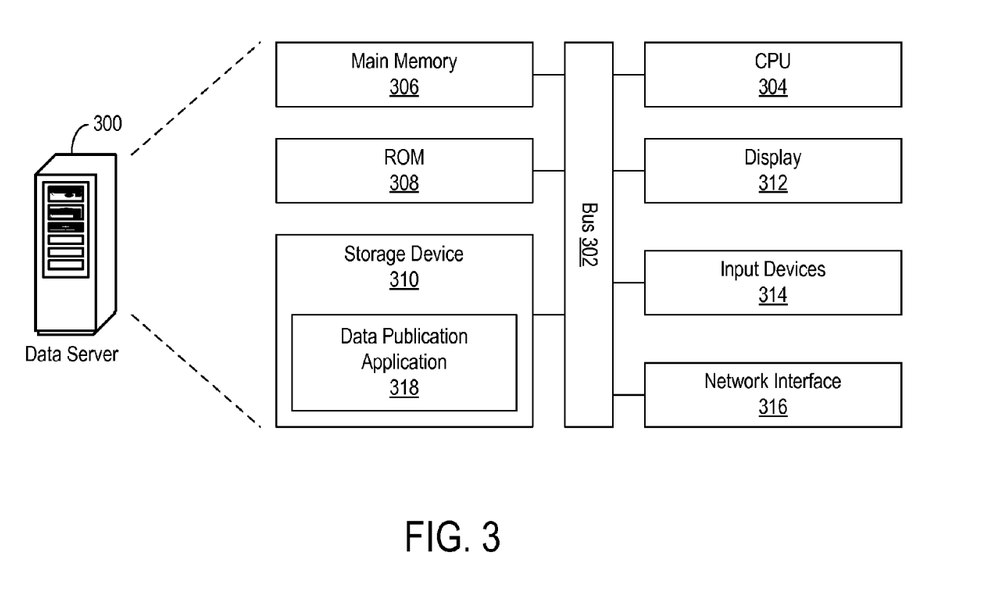
FIG. 3 is an exemplary system that may be used to create and maintain gold data sets according to the disclosed embodiments.

In accordance with the disclosed embodiments, one or more of the servers 212 may include a data server 300, as seen in FIG. 3. In a typical arrangement, the data server 300 may include a bus 302 or other communication pathway for transferring information within the data server 300 and a CPU 304 coupled with the bus 302 for processing the information. The data server 300 may also include a main memory 306, such as a random access memory (RAM) or other dynamic storage device coupled to the bus 302 for storing computer-readable instructions to be executed by the CPU 304. The main memory 306 may also be used for storing temporary variables or other intermediate information during execution of the instructions to be executed by the CPU 304.

The data server 300 may further include a read-only memory (ROM) 308 or other static storage device coupled to the bus 302 for storing static information and instructions for the CPU 304. A computer-readable storage device 310, such as a nonvolatile memory (e.g., Flash memory) drive or magnetic disk, may be coupled to the bus 302 for storing information and instructions for the CPU 304. The CPU 304 may also be coupled via the bus 302 to a display 312 for displaying information to a user. One or more input devices 314, including alphanumeric and other keyboards, mouse, trackball, cursor direction keys, and so forth, may be coupled to the bus 302 for communicating information and command selections to the CPU 304. As well, a communications interface 316 may be provided for allowing the data server 300 to communicate with an external system or network.

The term "computer-readable instructions" as used above refers to any instructions that may be performed by the CPU 304 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 310. Volatile media may include dynamic memory, such as main memory 306. Transmission media may include coaxial cables, copper wire and fiber optics, including wires of the bus 302. Transmission itself may take the form of electromagnetic, acoustic or light waves, such as those generated during radio frequency (RF) and infrared (IR) data communications. Common forms of computer-readable media may include, for example, magnetic medium, optical medium, memory chip, and any other medium from which a computer can read.

In accordance with the disclosed embodiments, a data publication application 318, or rather the computer-readable instructions therefor, may also reside on or be downloaded to the storage device 310. In general, the data publication application 318 is a computer program that substantially implements the concepts and principles disclosed herein. The computer program may be executed by the CPU 304 and/or other components of the data server 300 to generate and maintain gold data sets. Such a data publication application 318 may be written in any suitable computer programming language known to those having ordinary skill in the art using any suitable software development environment known to those having ordinary skill in the art. Examples of suitable programming languages may include C, C++, C#, FORTRAN, and the like. Examples of suitable software development environments include Visual Studio from Microsoft Corporation, and the like.

Figure 4:
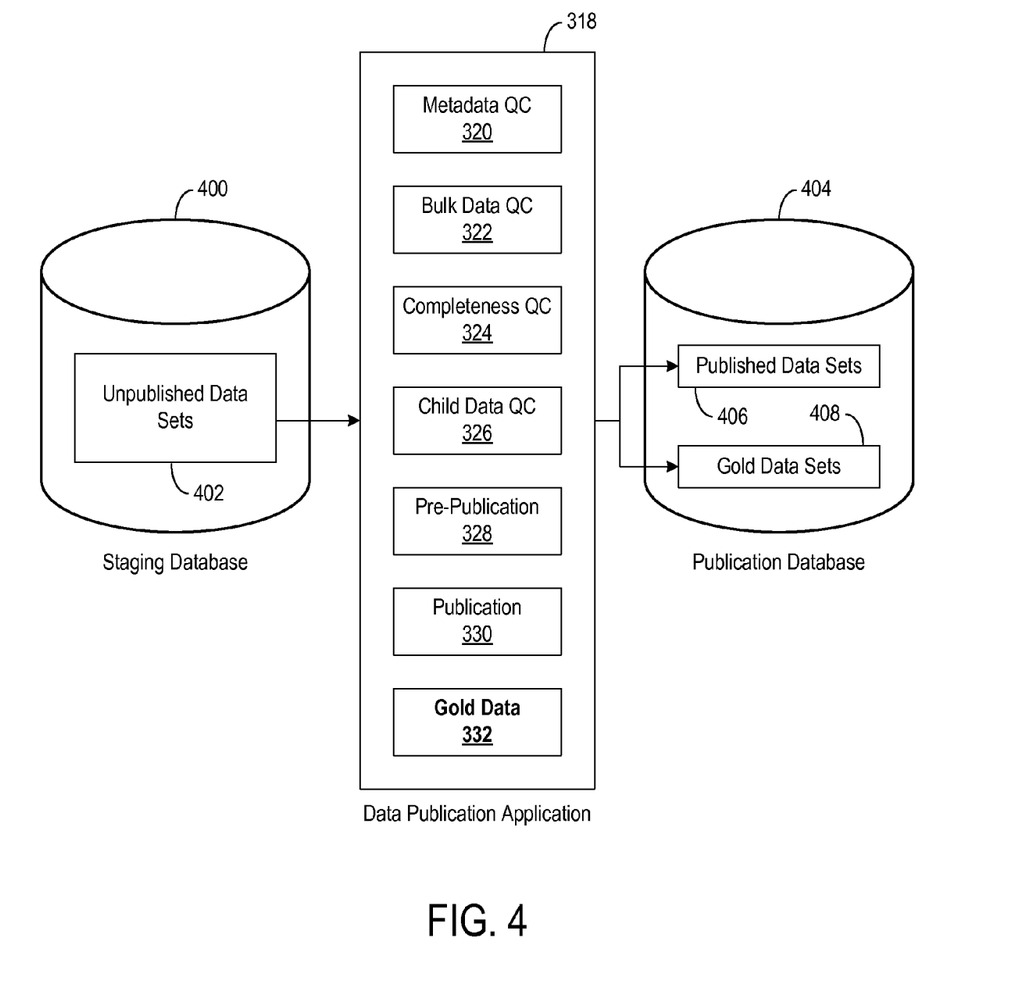
FIG. 4 is a functional diagram of an exemplary application that may be used to create and maintain gold data sets according to the disclosed embodiments.

FIG. 4 shows the data publication application 318 in more detail. Note that although FIG. 4 and other figures herein may include a number of functional blocks, it should be understood that any individual block may be divided into two or more constituent blocks, and that two or more blocks may be combined to form a single block, without departing from the scope of the exemplary disclosed embodiments. Also, although the various blocks may appear to be arranged in a particular sequence, it should be understood that one or more of the blocks may be taken outside the sequence shown, or omitted altogether in some cases, without departing from the scope of the exemplary disclosed embodiments.

As can be seen in FIG. 4, a staging database 400 may be used in some embodiments to hold newly generated or acquired data sets, or otherwise unpublished data sets, generally indicated at 402. These unpublished data sets 402 are then processed using the data publication application 318 in order to prepare them for publication. The processing of the unpublished data sets 402 may involve certain cleaning and formatting functions that are performed automatically using the data publication application 318 as well as other functions that are performed manually by users. Once the data is processed, it is transferred to or otherwise placed in a publication database 404 where it may be access by authorized users through the data portal 200 via the one or more servers 212 and databases 214 (see FIG. 2). Note that although two separate databases 400 and 404 are shown, in some embodiments, the two databases 400 and 404 may be combined on a single data storage device.

In accordance with the exemplary disclosed embodiments, the data in the publication database 404 may include both the generally published data sets, indicated at 406, as well one or more gold data sets, indicated at 408. The gold data sets 408 preferably resemble the published data sets 406 to the user in terms of formatting and layout in the data portal 200, except that they are labeled or otherwise designated as the gold data sets 408. Indeed, the gold data sets 408 may be subsets of the published data sets 406, and both the published data sets 406 and the gold data sets 408 may be derived from the same unpublished data sets 402 held in the staging database 400.

Internally, the gold data sets 408 may be identified within the publication database 404 using either a distinctive primary or secondary key. For example, a primary key with the name "Petrophysical" and the data type "Gold" may be used to identify the preferred data for input to a petrophysical interpretation application. This identification allows users to find such data easily and also optionally to highlight the data in any data browser.

In order to process the unpublished data sets 402, the data publication application 318 may include a number of functional modules that may be performed either automatically or manually. For example, the data publication application 318 may include a metadata quality check module 320, a bulk data quality check module 322, a completeness quality check module 324, a child data quality check module 326, a pre-publication module 328, and a publication module 330. These modules 320-330 provide the functionality implied by their names and are generally well understood by those having ordinary skill in the art, and therefore a detailed description is omitted here. For example, the completeness quality check module 324 may be used to ensure that none of the data from the unpublished data set 402 being processed was inadvertently omitted, and so on.

Figure 5:
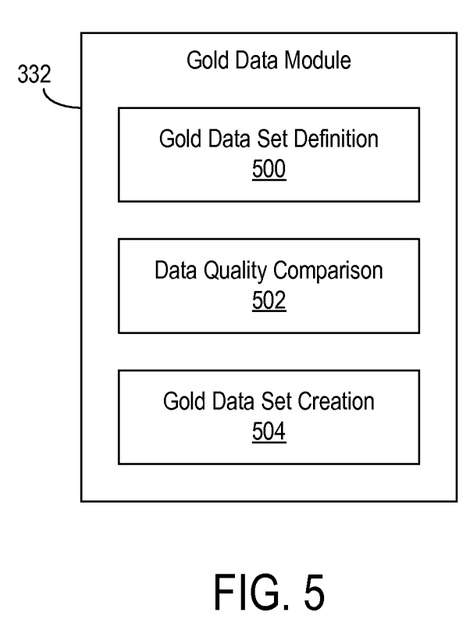
FIG. 5 is a functional diagram of an exemplary module that may be used to create and maintain gold data sets according to the disclosed embodiments.

Also included in the data publication application 318 is a gold data module 332, a more detailed depiction of which may be seen in FIG. 5. As shown in FIG. 5, the gold data module 332 may include a number of functional components, including a gold data set definition component 500, a data quality comparison component 502, and a gold data set creation component 504. At a high level, the gold data set definition component 500 operates to specify the data sets that are to be held up as gold data sets as well as the type of data or data components making up those gold data sets. The data quality comparison component 502 operates to filter the published or to-be-published data sets against a plurality of gold data rules to determine whether any of the data components may be used in the gold data sets. Finally, the gold data set creation component 504 operates to maintain and update existing gold data sets and create new gold data sets based on the results of the data quality comparison component 502, including naming or renaming them to something that is easily identifiable as a gold data set.

Examples of the gold data rules that may be applied to the data being filtered may include data type rules, data currency rules, data quality rules, and data name rules. Of course, the specific gold data rules used in the data quality comparison component 502 may vary according to the specific requirements of a particular application without departing from the scope of the disclosed embodiments.

In general operation, the various gold data rules used by the gold data module 332 may reside in a data dictionary and may have a hierarchical order of preference in terms of which rules are applied to the components of a data set. For example, the data type rules may be applied before the data currency rules, the data currency rules may be applied before the data quality rules, the data quality rules may be applied before the data name rules, and so on. Alternative orders of preference may also be used without departing from the scope of the disclosed embodiments.

Specifically, the data type rules may be used to determine whether the data in a published or to-be-published data set matches the type of data specified for a given gold data set. For example, for a petrophysical gold data set, the data type rules may specify gamma ray (GR), neutron porosity (NPHI), density (RHOB), resistivity data, and the like. A match is found if the published or to-be-published data set contains one of the specified components. The data currency rules, data quality rules, and data name rules may then be applied to the matched data component.

The data currency rules may specify a preference for recently updated existing data over newly generated data, and so on, such that repeated or redundant data sets may be avoided. The data quality rules may specify a preference for data from Vendor A over data from Vendor B, or a preference for data with the greatest bottom depth available, and so forth. Likewise, the data name rules may specify a preference for gamma ray data called "GR" over gamma ray data called "SGR," and the like. Thus, if the data being published contains a "GR" curve, then that "GR" curve would be deemed as preferred over the current gamma ray curve for a gold data set relating to the well bore of interest. Alternatively, if the gold data set does not currently contain a "GR" curve, then either a copy of, or a link to, the newly published "GR" curve may be created in the gold data set, replacing any previous "GR" curve in the gold data set.

In some embodiments, the gold data sets may be tables in the publication database 404, and the tables may be named in a standardize way as to be easily identified as a source for the best versions of particular types of data. For example, a well log might be named in a standard way, and/or with an attribute, that implies it contains the most recent versions of a number of the most important petrophysical curves. Other types of gold data sets may be defined according to the client or customer requirements. Examples may include zonations or plots created during the most recent or authorized interpretations. There may of course be more than one type of gold data set 408 for a given client or customer. If a given gold data set, for example, a petrophysical gold data set, does not exist, then it may be created by the gold data set creation component 504 as soon as there are any published or to-be-published data sets available that have the particular type of data matching the data components for a petrophysical gold data set, as specified by the gold data set definition component 500.

In some embodiments, the gold data set creation component 504 may create two basic types of gold data sets: (1) compiled data sets, which are created and maintained by populating a parent gold data set, or table, of known/standardized name with individual matching data components from one or more other tables based on the various gold data rules; and (2) single table data sets, which are created by copying an entire matching table based on the various gold data rules and giving it a known/standardize gold data set name. Thus, in the case of a single table data set, a new gold data set may be created simply by copying and renaming any matching published or to-be-published table. In the case of a compiled data set, a gold data set may be created by creating a new empty table if one does not already exist, specifying the primary keys, and populating the newly created table with matching data components from other published or to-be-published tables. For both types of gold data sets, the primary keys for the gold data sets should be defined so that the data sets may be identified easily.

In the foregoing embodiments, the gold data set definition component 500 defines and specifies the type of data or data components to be used to populate the different gold data sets. In alternative embodiments, the particular data components used to populate the gold data sets may be specified in a reference table. Indeed, for a single table data set, the information for identifying matching data components may be included in the data set definition itself. Thus, if the entity type of the reference table is the same as that of the data set, then it is implicit that the data set is of the "single" rather than the "compiled" variety.

It may be necessary in some embodiments to deal with any previously existing gold data set. One option is simply to replace the existing table, but it may also be useful to provide an archive option to preserve any previous data sets, for example by renaming it and/or by appending a date stamp to the previous name.

As mentioned above, matching the published or to-be-published tables that are to be copied as gold data sets or to be copied to become a gold data set is performed by the data quality comparison component 502 according to the gold data rules. These gold data rules may specify a pecking order of preference by which matches may be made within the data being examined. The best matches within the data set being examined may be found and compared to the best existing match in the gold data set based on the gold data rules. If the quality of the match for a particular component in the data set being examined is as good as or better than the quality of the data in the gold data set, then that component in the gold data set may be replaced with the one in the data being examined. If no match can be found or the quality of the match of the newer data is inferior, then the existing gold data set may be left unmodified.

In some embodiments, there may be special prioritization provisions to allow a given table to be considered of higher priority based on a feature other than purely a match based on the gold data rules. For example, priority may be given to a petrophysical curve based on its depth range coverage such that a spliced curve covering a greater depth range may be considered preferable to an un-spliced curve covering only a smaller range. In these special prioritization embodiments, a special flag may be implemented in the table, for example, "GREATEST DEPTH RANGE," or "MOST RECENTLY LOGGED," and so forth, rather than relying solely on direct matching via a primary or secondary key in the table.

In some embodiments, the data quality comparison component 502 may use a predefined scoring system to score the matches. For example, a point may be awarded for each one of the gold data rules matched, and the cumulative point total is used as the score for a matching data component. Thus, under such a system, the highest scoring data component may not necessarily be the newest or most recent data component. The specific scoring methodology used is not overly important to the practice of the disclosed embodiments and any suitable scoring methodology may be used, including a weighted scoring methodology, without departing from the scope of the disclosed embodiments. An attribute stamp indicating the quality of the matched data component may then be associated with or applied to any match data component actually copied to (or forming) a gold data set in order to make subsequent quality comparisons to future available data sets simpler.

Although one objective of the disclosed embodiments is to automate the creation of gold data sets as much as possible, in some embodiments, there may be a provision in the gold data module 332 for users to override the gold data rules and place their favorite data within the gold data set by hand, such that the data may not be automatically replaced by any future publishing activity. This may be achieved by omitting the above-mentioned attribute stamp from any data manually placed in the gold data set, or otherwise identifying such manually placed data. Thereafter, the gold data module 332 may check that any data that is about to be replaced has an attribute stamp associated therewith, indicating that the data was placed there by the gold data module 332 and not by the user, before replacing such data. If the data to be replaced does not have an appropriate attribute stamp, then it may be assumed to have been copied to the data set by hand and may not be replaced.

In some embodiments, a provision may be provided in the gold data module 332 to favor data with some specific attribute set and thus data that has been stamped with that attribute by hand in the staging database 400 may be prioritized for publication to a gold data set. These embodiments allow users to intervene in the event a special case arises where the users want to manually indicate as gold certain data that was not otherwise selected as gold. The stamped attribute allows the users to have the data in question selected as gold without having to circumvent the gold data module since explicit user indication of gold data can be taken into account when applying the gold data rules in the normal course.

As well, in some embodiments, the gold data module 332 may rename any gold data set created using a standardized name in order to make identification easier. Although it may be simplest if the values of all primary keys in the gold data set are defined, it may be useful for the gold data module 332 to retain one or more keys from the original data being copied so the original keys in the data may be merged with those defined by the gold data rules in the data dictionary to determine the ultimate set of keys used. The gold data module 332 may also keep the original storage path of the copied table in an attribute for reference.

Following now are several examples of pseudocode that may be used to implement the gold data module 332 according to the exemplary disclosed embodiments. In the first example, a list of the gold data sets to be created or maintained is specified, including a "Petrophysical" data set, a "Geology" data set, a "Driller" data set, and a "Plots" data set.

```
/* List of Gold Data tables*/

BEGIN TABLE
    TABLE=GOLD DATA
    BEGIN ENTRIES
        PETROPHYSICAL
        GEOLOGY
        DRILLER
        PLOTS
    END ENTRIES
END TABLE
```

In the next pseudocode example, the "Petrophysical" gold data set is defined, including what kind of data set it is, what it may be called, references to the definition of the data it may contain, and so forth. As can be seen, the "Petrophysical" data set may have a primary key called "QPETRO" and may include the types of data identified following the "MATCHES" statement.

```
/* Details of the "Petrophysical" table */

BEGIN TABLE
    TABLE=PETROPHYSICAL
    BEGIN ENTRIES
        ENTITY=LOG
        KEYS=(LOG=(NAME=QPETRO, LOG TYPE=GOLD))
        MATCHES=(QGR, QDENS, QDT, QRT, QRXO, QSP, QPHI,
            QNEUT)
    END ENTRIES
END TABLE
```

The following pseudocode example shows how the "QGR" data component may be selected and copied to the "Petrophysical" data set. The example includes a prioritized list of paths to attempt to find a match. If a match is found in the new data that is of equal or better quality than any existing "QGR" match in the "Petrophysical" data set, then the new data is copied to that "Petrophysical" data set applying the logic set in the "status" statement. This example effectively selects the "GR" curve from a favored gamma ray tool type and a favored logging tool type.

```
/* Details of how to select the "QGR" item */

BEGIN TABLE
    TABLE=QGR
    BEGIN ENTRIES
        ENTITY=CURVE
        STATUS=REPLACE
        KEYS=(CURVE=(NAME=GR, CURVE TYPE=GAMMA))
        MATCH1=(PATH=(LOG=(NAME=*, LOG TYPE=RAW),
            CURVE=(NAME=GR, CURVE TYPE=GAMMA)))
        MATCH2=(PATH=(LOG=(NAME=*, LOG TYPE=RAW),
            CURVE=(NAME=SGR, CURVE TYPE=GAMMA)))
        MATCH3=(PATH=(LOG=(NAME=*, LOG TYPE=IMAG),
            CURVE=(NAME=GR, CURVE TYPE=GAMMA)))
```

```
/* Details of how to select the "QGR" item */
                    -continued MATCH4=(PATH=(LOG=(NAME=*, LOG TYPE=*),
            CURVE=(NAME=*, CURVE TYPE=GAMMA)))
    END ENTRIES
END TABLE
```

In a similar manner, the below pseudocode example shows how the "QSP" data component may be selected and copied to the "Petrophysical" data set. This example effectively selects the "SP" curve with the greatest depth range.

```
/* Details of how to select the "QSP" item */

BEGIN TABLE
    TABLE=QSP
    BEGIN ENTRIES
        ENTITY=CURVE
        STATUS=REPLACE
        KEYS=(CURVE=(NAME=SP, CURVE TYPE=SPON))
        MATCH1=(PATH=(LOG=(NAME=*, LOG TYPE=*),
            CURVE=(NAME=SP))), (DEPTH=MAXRANGE)
    END ENTRIES
END TABLE
```

Likewise, the next pseudocode example shows how to select and copy the "QNEUT" data component to the "Petrophysical" data set. Again, a prioritized list of paths to attempt to match is included. This example selects the neutron curve from the preferred tool type (or falls back on a default if none is found). In this example, any previous matches in the Petrophysical log is retained and the new preferred curve is distinguished by giving it a higher version number.

```
/* Details of how to select the "QNEUT" item */

BEGIN TABLE
    TABLE=QNEUT
    BEGIN ENTRIES
        ENTITY=CURVE
        STATUS=NEW VERSION
        KEYS=(CURVE=(CURVE TYPE=NEUT))
        MATCH1=(PATH=(LOG=(NAME=*, LOG SERVICE=*CNTA*),
            CURVE=(NAME=*, CURVE TYPE=NEUT)))
        MATCH2=(PATH=(LOG=(NAME=*, LOG SERVICE=*CNTD*),
            CURVE=(NAME=*, CURVE TYPE=NEUT)))
        MATCH3=(PATH=(LOG=(NAME=*, LOG TYPE=*),
            CURVE=(NAME=*, CURVE TYPE=NEUT)))
    END ENTRIES
END TABLE
```

In the preceding example, the MATCH statements in the table, called the QNEUT table, represent a pecking order of preferences for selecting a NEUT curve. A match like the one in the MATCH1 statement is preferred over a match of like the one in the MATCH2 statement, and so forth. Thus, if the data set to be published contains two NEUT types curves, then the curve matching the MATCH1 statement will be the one placed in the gold data set. Moreover, if the gold data set already contains a curve like the one in the MATCH1 statement, but the new data set contains only a curve like the one in the MATCH2 statement, then the one in the gold data set is kept, and the gold data set is not updated with the one from the new data set.

The following pseudocode example shows the "Geology" gold data set being defined, including what kind of data set it is, what it may be called, references to the definition of the data it may contain, and so forth. In this example, the Geology gold data set includes a zonation data type that will actually be a copy of the matched Zonation table, as the data type of the matching table will be the same as the data type of the Geology gold data set to be maintained. More to the point, the pseudocode shows an example of an entire table being designated as a gold data set rather than a gold data set that is constructed from a number of individual data components. In other words, the pseudocode is looking for the best lithological zonation table in its entirety rather than trying to construct a gold data set from the best set of data components available, as was the case in the previous example for the "Petrophysical" data (i.e., a "single table dataset" rather than a "compiled table dataset").

```
/* Details of the "Geology" table */
BEGIN TABLE
  TABLE=GEOLOGY
  BEGIN ENTRIES
    ENTITY=ZONATION
    STATUS=REPLACE
    KEYS=(ZONATION=(NAME=STRATIGRAPHY,
    ZONATION TYPE=GOLD))
    MATCHES=(QLITH)
  END ENTRIES
END TABLE
```

Finally, below is a pseudocode example showing how to select the "QLITH" data component that will be used as the "Geology" data set. As before, the example includes a prioritized list of paths to attempt to find a match. This example tries to find a zonation of the right type, but may settle for a zonation with a name that looks promising if the right one cannot be found. Any existing gold geological stratigraphy zonation will be renamed with a date stamped name.

```
/* Details of how to select the "QLITH" item */
BEGIN TABLE
  TABLE= QLITH
  BEGIN ENTRIES
    STATUS=ARCHIVE
    ENTITY=ZONATION
    MATCH1=(PATH=(ZONATION=(NAME=*,
    ZONATION TYPE=STRAT)))
    MATCH2=(PATH=(ZONATION=(NAME=STRAT*,
    ZONATION TYPE=*)))
  END ENTRIES
END TABLE
```

Figure 6:
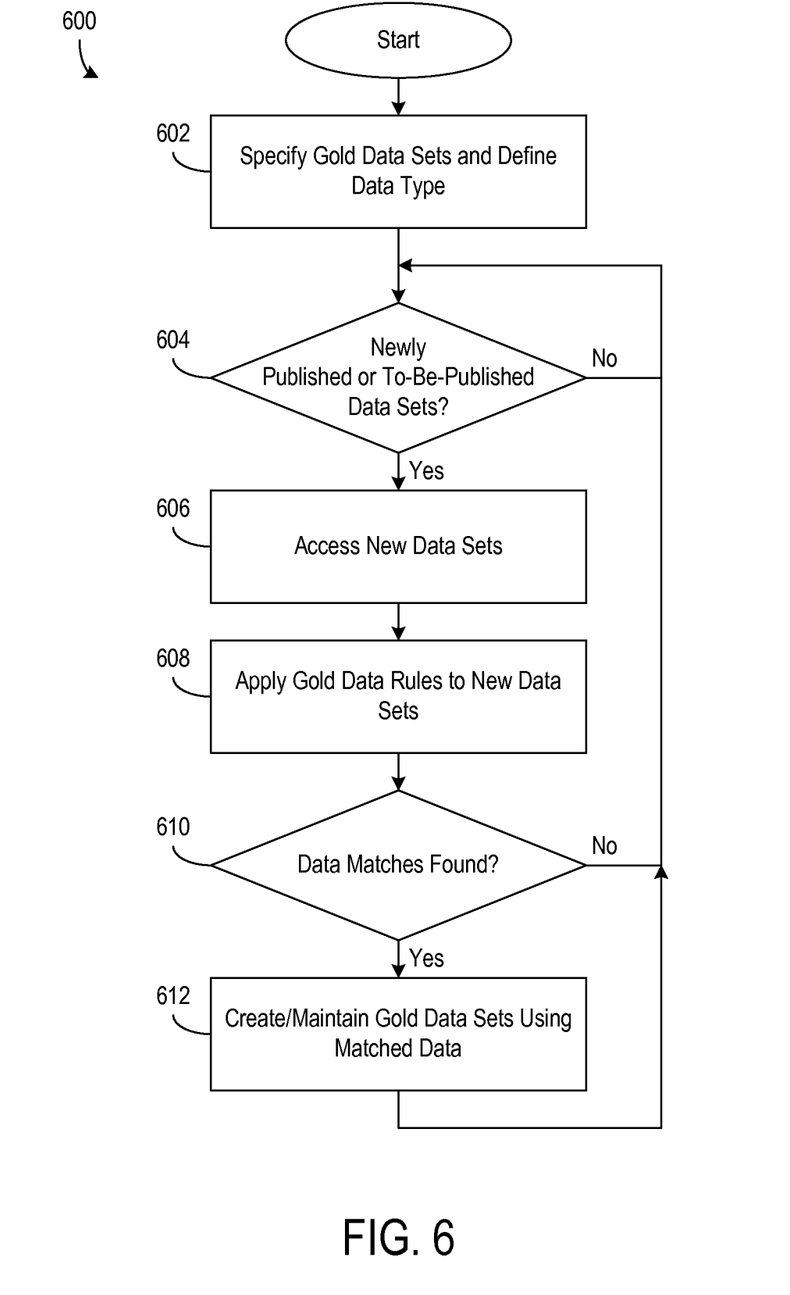
FIG. 6 is an exemplary flowchart that may be used to create and maintain gold data sets according to the exemplary disclosed embodiments.

In the foregoing figures and description, a particular implementation of a gold data module according to exemplary embodiments has been disclosed. Additional and/or alternative implementations of the gold data module may be developed without departing from the scope of the disclosed embodiments. To this end, FIG. 6 shows exemplary steps or guidelines in the form of a flow chart 600 that may be used for any implementation of a gold data module according to the disclosed embodiments. Such a flow chart 600 may be a standalone flow chart that may be executed as needed, or it may be incorporated as part of a larger overall data publication workflow, depending on the particular application.

As can be seen in FIG. 6, possible implementations of the gold data module generally begin at step 602, where gold data sets are specified in the types of data to be included in each gold data set is defined. Examples of gold data sets that may be specified may include petrophysical, geology, driller, plots, and like. At block 604, a determination is made whether there are newly published or to-be-published data sets. If the determination is no, then the gold data module continues to monitor for newly published or to-be-published data sets.

If the determination at block 604 is yes, then at block 606, the new data sets are accessed, and at block 608, one or more gold data rules are applied to the new data sets. Examples of gold data rules that may be applied may include data type rules, data currency rules, data quality rules, data name rules, and the like. A determination is made at block 610 whether any data matches are found based on the gold data rules. If the determination is no, then the gold data module returns to block 604 to continue monitoring for newly published or to-be-published data sets. If the determination at block 610 is yes, then at block 612, new gold data sets are created and/or existing data sets are maintained using the matched data. The gold data module thereafter returns to block 604 to continue monitoring for newly published or to-be-published data sets.

As demonstrated above, the disclosed embodiments facilitate automation of gold data set identification and classification within the context of a data publication workflow. The embodiments contemplate relatively complex rules for creating composite gold data sets of different types from curves, files, or other data that may exist in multiple tables so that the best curve data is not necessarily the newest log available. Thus, for example a gold petrophysical log data set might include a set of curves derived from multiple raw logs representing the preferred tool types, preferred vendors, longest recorded intervals, and/or many other attributes that are recorded in the source published curve/log meta data and bulk data. Such an arrangement helps ensure the gold data sets at any given time will reflect the best or most preferred available data from the data that has been made available to end users via publication. While the disclosed embodiments have been discuss with respect to hydrocarbon exploration and production, the principles and concepts discussed herein are applicable to any database using a publication type of workflow where data is initially loaded to an internal database for some form of processing or cleanup and subsequently published to a corporate database for use by end users.

Accordingly, as set forth above, the embodiments disclosed herein may be implemented in a number of ways. In general, in one aspect, the disclosed embodiments relate to a computer-based system for creating and maintaining data sets for a hydrocarbon exploration or production operation. The system comprises, among other things, a central processing unit mounted within the computer-based system and a publication database connected to the computer-based system, the publication database containing a published data set and a gold data set, each data set being composed of predefined data components. The system also comprises a data input unit connected to the central processing unit, the data input unit receiving a processed data set that has been published or is to be published in the publication database, the processed data set being composed of predefined data components. The system further comprises a storage device connected to the central processing unit, the storage device storing therein a gold data module. The gold data module is executable by the central processing unit to determine whether a data component of the processed data set matches a data component of the gold data set, perform a comparison of a quality of such data component of the processed data set to a quality of such data component of the gold data set, and replace such data component of the gold data set with such data component of the processed data set if the comparison satisfies a predefined condition.

In general, in another aspect, the disclosed embodiments relate to a computer-based method of creating and managing data sets related to a wellbore. The method comprises, among other things, the steps of receiving a processed data set that has been published or is to be published in a publication database, the publication database containing a published data set and a gold data set, each data set being composed of predefined data components. The method further comprises the steps of determining whether a data component of the processed data set matches a data component of the gold data set, performing a comparison of a quality of such data component of the processed data set to a quality of such data component of the gold data set, and replacing such data component of the gold data set with such data component of the processed data set if the comparison satisfies a predefined condition.

In general, in yet another aspect, the disclosed embodiments relate to a computer-readable medium storing computer-readable instructions for causing a computer to create and maintain data sets related to a subterranean formation. The computer-readable instructions comprise instructions for causing the computer to receive a processed data set that has been published or is to be published in a publication database, the publication database containing a published data set and a gold data set, each data set being composed of predefined data components. The computer-readable instructions also comprise instructions for causing the computer to determine whether a data component of the processed data set matches a data component of the gold data set, and perform a comparison of a quality of such data component of the processed data set to a quality of such data component of the gold data set. The computer-readable instructions further comprise instructions for causing the computer to replace such data component of the gold data set with such data component of the processed data set if the comparison satisfies a predefined condition.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the exemplary disclosed embodiments as defined in the appended claims.

What is claimed is:

1. A computer-based system for creating and maintaining data sets for a hydrocarbon exploration or production operation, comprising:
    a central processing unit mounted within the computer-based system;
    a publication database connected to the computer-based system, the publication database containing a published data set and a gold data set, each data set being composed of predefined data components, the gold data set including a designated data component that is preferred over a data component of the published data set for use in performing the hydrocarbon exploration or production operation;
    a data input unit connected to the central processing unit, the data input unit receiving a processed data set that has been published or is to be published in the publication database, the processed data set being composed of predefined data components; and
    a storage device connected to the central processing unit, the storage device storing therein a gold data module executable by the central processing unit, the gold data module executed by the central processing unit to determine whether a data component of the processed data set matches the designated data component of the gold data set, perform a comparison of a quality of such data component of the processed data set to a quality of such data component of the gold data set, and replace such data component of the gold data set with such data component of the processed data set based on the comparison;
    wherein the gold data module is further executed by the central processing unit to perform one of the following: designate the processed data set as a new gold data set in the publication database if no data component of the processed data set matches a data component of the gold data set or replace the gold data set with the processed data set in the publication database if the predefined data components of the processed data set match the predefined data components of the gold data set.

2. The computer-based system of claim 1, wherein the gold data module is further executed by the central processing unit to apply an attribute stamp to the data component of the processed data set indicating the quality of such data component.

3. The computer-based system of claim 1, wherein the gold data module is executed by the processing unit to perform the comparison by applying a plurality of gold data rules to the data component of the processed data set and the data component of the gold data set and determine a score for each data set.

4. The computer-based system of claim 3, wherein the plurality of gold data rules include one or a combination of the following: data currency rules, data quality rules, and data name rules.

5. The computer-based system of claim 1, wherein the gold data module is executed by the processing unit as part of a data publication workflow, the data publication workflow making the published data set and the gold data set accessible to users via a data portal.

6. A computer-based method of creating and managing data sets related to a wellbore, comprising:
    receiving a processed data set that has been published or is to be published in a publication database, the publication database containing a published data set and a gold data set, each data set being composed of predefined data components, the gold data set including a designated data component that is preferred over a data component of the published data set for use in performing the hydrocarbon exploration or production operation;
    determining whether a data component of the processed data set matches the designated data component of the gold data set;
    performing a comparison of a quality of such data component of the processed data set to a quality of such data component of the gold data set; and
    replacing such data component of the gold data set with such data component of the processed data set based on the comparison;
    wherein the gold data set is replaced with the processed data set in the publication database if the predefined data components of the processed data set match the predefined data components of the gold data set, or wherein the processed data set is designated as a new gold data set in the publication database if no data component of the processed data set matches a data component of the gold data set.

7. The computer-based method of claim 6, further comprising applying an attribute stamp to the data component of the processed data set indicating the quality of such data component.

8. The computer-based method of claim 6, wherein the comparison is performed by applying a plurality of gold data rules to the data component of the processed data set and the data component of the gold data set and determining a score for each data set.

9. The computer-based system of claim 8, wherein the plurality of gold data rules include one or a combination of the following: data currency rules, data quality rules, and data name rules.

10. The computer-based method of claim 6, wherein the method is part of a data publication workflow, the data publication workflow making the published data set and the gold data set accessible to users via a data portal.

11. A non-transitory computer-readable medium storing computer-readable instructions for causing a computer to create and maintain data sets related to a subterranean formation, the computer-readable instructions comprising instructions for causing the computer to:
   receive a processed data set that has been published or is to be published in a publication database, the publication database containing a published data set and a gold data set, each data set being composed of predefined data components, the gold data set including a designated data component that is preferred over a data component of the published data set for use in performing the hydrocarbon exploration or production operation;
   determine whether a data component of the processed data set matches a data component of the gold data set;
   perform a comparison of a quality of such data component of the processed data set to a quality of such data component of the gold data set; and
   replace such data component of the gold data set with such data component of the processed data set based on the comparison;
   wherein the computer-readable instructions further cause the computer to perform one of the following: replace the gold data set with the processed data set in the publication database if the predefined data components of the processed data set match the predefined data components of the gold data set or designate the processed data set as a new gold data set in the publication database if no data components of the processed data set matches a data component of the gold data set.

12. The computer-readable medium of claim 11, wherein the computer-readable instructions further cause the computer to apply an attribute stamp to the data component of the processed data set indicating the quality of such data component.

13. The computer-readable medium of claim 11, wherein the computer-readable instructions cause the computer to perform the comparison by applying a plurality of gold data rules to the data component of the processed data set and the data component of the gold data set and determining a score for each data set, wherein the plurality of gold data rules include one or a combination of the following: data currency rules, data quality rules, and data name rules.

14. The computer-readable medium of claim 11, wherein the computer-readable instructions are part of a data publication workflow, the data publication workflow making the published data set and the gold data set accessible to users via a data portal.

* * * * *